United States Patent [19]
Parsons

[11] 3,889,962
[45] June 17, 1975

[54] SEALS FOR COLLETS

[75] Inventor: Hubert J. Parsons, Horseheads, N.Y.

[73] Assignee: Hardinge Brothers, Inc., Elmira, N.Y.

[22] Filed: Jan. 8, 1974

[21] Appl. No.: 431,708

[52] U.S. Cl.............................. 279/46; 279/1 ME
[51] Int. Cl............................................ B23b 31/20
[58] Field of Search............ 279/1 Q, 1 ME, 46–53, 279/41–43

[56] References Cited
UNITED STATES PATENTS

| | | | |
|---|---|---|---|
| 2,346,706 | 4/1944 | Stoner | 279/46 |
| 2,448,423 | 8/1948 | Dodge | 279/1 ME X |
| 3,669,462 | 6/1972 | Parsons | 279/1 Q X |

FOREIGN PATENTS OR APPLICATIONS 482,766   4/1938   United Kingdom............. 279/1 ME Primary Examiner—Andrew R. Juhasz
Assistant Examiner—Z. R. Bilinsky
Attorney, Agent, or Firm—Shlesinger, Arkwright, Garvey & Dinsmore

[57] ABSTRACT

This invention relates to seals for use with machine tool collets which have a cylindrical body and slots in said body forming a plurality of fingers. The seals of this invention are secured in the slots and include a length of tubing or a longitudinal section thereof, secured in the major portion of the slots, the tubing being able to easily flex upon opening and closing of the collet.

9 Claims, 9 Drawing Figures

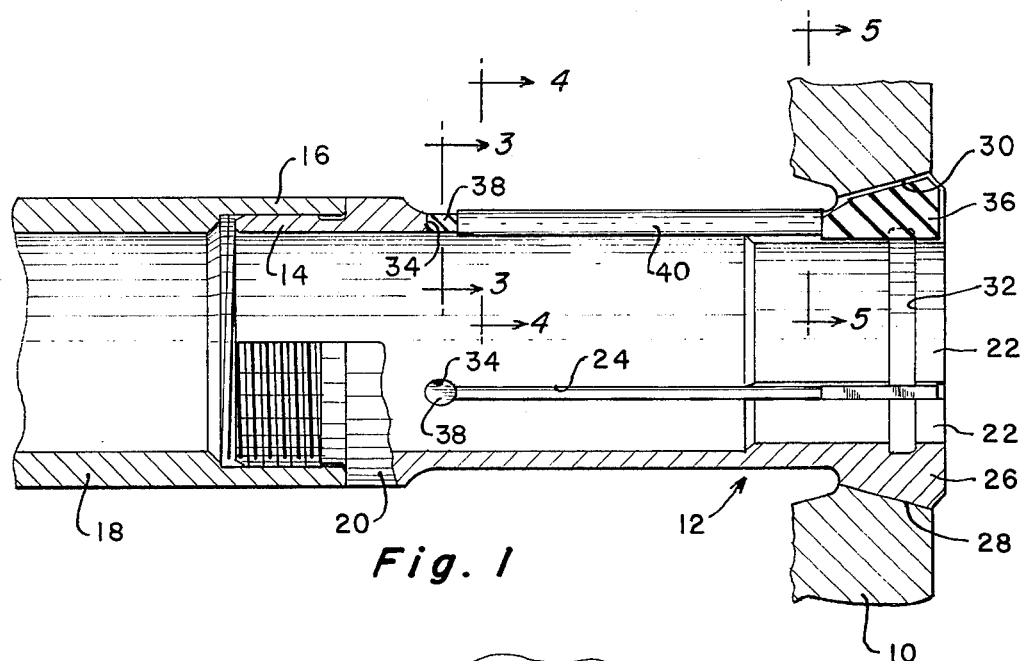
Fig. 1
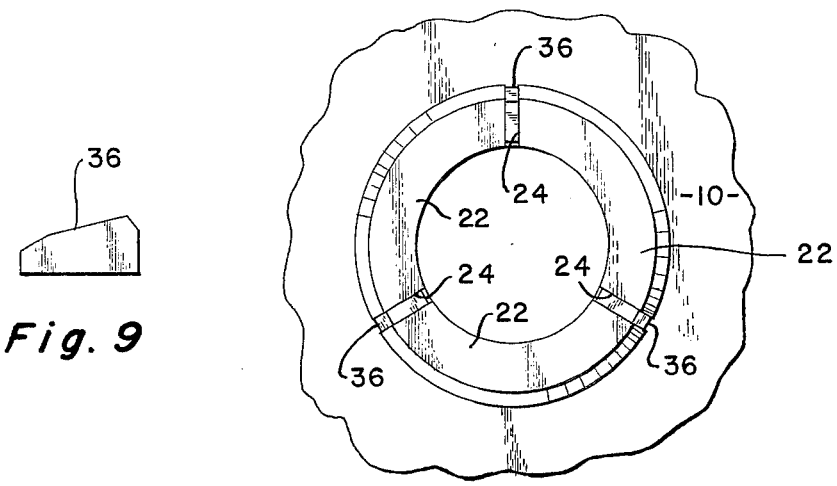
Fig. 9
Fig. 2
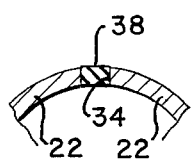 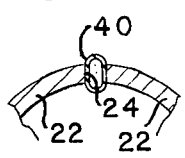 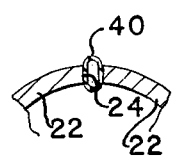
Fig. 3    Fig. 4    Fig. 5
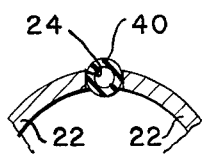 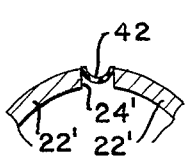 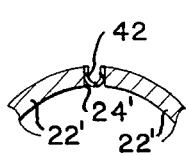
Fig. 6    Fig. 7    Fig. 8

SEALS FOR COLLETS

This invention relates to seals for machine tool collets. More particularly, this invention relates to an improved type of resilient seal for machine tool collets.

BACKGROUND AND OBJECTS

Many different types of seals have been proposed for use in machine tool collets. Such seals are needed for use on machine tool collets because of metal chips, dust, dirt, oil or the like which is always present in the immediate vicinity of the operating parts of the collets, but which must be excluded from the space between the collet and the spindle to permit proper and accurate collet operation. In machining to very accurate tolerances, and with great precision, small particles or chips of metal which get into the space damage the workpiece and/or the collet and reduce the accuracy of the machining operation.

Many prior art seals have been proposed, and such prior art seals take a variety of forms. For example, U.S. Pat. No. 2,448,413, Dodge, discloses a collet seal which includes a length of rubber extending through the full length of the collet slots, and the lengths of rubber being integral with an additional piece of rubber covering the face of the collet.

Another type of seal is shown in U.S. Pat. No. 2,012,826 to Montgomery, but this seal only seals the heads of the collets, and not the major portion of the slots.

Still another type of collet seal is shown in U.S. Pat. No. 3,539,193 issued to Parsons. These seals are of a type and configuration such that they may be inserted from the front of the collet without disassembling the same from the machine tool.

A collet is by definition a workpiece holding device which has flexible work-gripping fingers which spread to release the work and are forced together to grip the work (or the opposite in the case of an expanding collet). This flexing of the collet fingers is permitted by means of longitudinal slots in the body of the collet. It is these slots which must be sealed to prevent foreign matter from entering the space between the collet and spindle. However, due to the flexing of the collet fingers, a rigid type of seal is not suitable. All of the previously mentioned collets use as the sealing element a piece of rubber, sponge or otherwise, in place in the slots. The rubber properly fits the slots when the collet is in its open or relaxed state and the rubber is compressed when the collet is closed. These seals have worked well in achieving their purpose, however, certain manufacturing difficulties arise in connection therewith. For example, different collets of different sizes or different manufacture may have different sized slots therein, and thus different sized seals are needed to accommodate the variously sized slots and therefore manufacturing costs are increased.

Additionally, with repeated and extended use of the prior art seals, and thus repeated compression and expansion of the seals, the resilient material tends to lose strength and/or its ability to return to its normal shape when the collet is opened.

Accordingly, it is a primary object of this invention to provide collet seals which overcome the disadvantages of prior art seals.

Another object of this invention is to provide collet seals which are easily installed in the collet.

A further object of this invention is to provide collet seals of the simple yet reliable and durable construction.

Still another object of this invention is to provide collet seals which are inexpensive to manufacture, install and use.

Still a further object of this invention is to provide collet seals which may be readily accommodated by different sized collets.

DESCRIPTION OF THE DRAWINGS

These and other objects and advantages of this invention will become apparent when considered in light of the following description and claims when taken together with the drawings in which:

FIG. 1 is a longitudinal sectional view showing a typical collet with seals according to this invention installed;

FIG. 2 is a right end view of the collet of FIG. 1;

FIG. 3 is a sectional view along line 3—3 of FIG. 1 and viewed in the direction of the arrows;

FIG. 4 is a sectional view along line 4—4 of FIG. 1 and viewed in the direction of the arrows;

FIG. 5 is a sectional view along line 5—5 of FIG. 1 and viewed in the direction of the arrows;

FIG. 6 is a view similar to FIG. 5 showing the collet seal of this invention with the collet open;

FIG. 7 is a view similar to FIG. 6 showing an alternate embodiment of this invention;

FIG. 8 is a view similar to FIG. 5 of the embodiment shown in FIG. 7; and

FIG. 9 is a plan view of one of the elements of collet seals according to this invention.

DESCRIPTION OF THE PREFERRED EMBODIMENT

Referring now to FIG. 1, a machine tool spindle 10 is fragmentarily shown with a collet generally designated 12 shown mounted therein. Collet 12 includes a threaded rear portion 14 which threadedly engages the front portion 16 of a conventional draw tube 18 as mounted on a lathe.

The collet 12 comprises a tubular body having a rear portion 20 and a plurality of fingers 22 extending therefrom and separated by slots 24.

The head portion 26 of the collet includes a tapered cam surface 28 which cooperates with cam surface 30 on the spindle 10 to close the collet fingers 22 when the collet is moved to the left as seen in FIG. 1 with respect to the spindle 10 by means of the draw tube 18.

The head portion 26 of the collet is also provided with an annular groove 32 which serves to anchor collet pads (not shown) within the collet body. Such a construction is shown in my U.S. Pat. No. 3,539,193 which is incorporated herein by reference. However, this invention is not limited to collets of the so-called master type which utilize jaws, but also is equally applicable to the conventional collets which do not use work gripping pads.

The rear portion of the slots 24 is provided with substantially circular strain-relief cutout portions 34 which serve to permit good flexure of the collet fingers 22 without undue stress buildup at the rear of the slots 24.

The construction thus far described is substantially conventional in the machine tool industry.

At the head portion 26 of the collet 12 and in the slots 24 adjacent the head portion 26 are resilient pads 36. These pads may be die cut from a sheet of suitable material which is preferably a rubber sponge material such as Neoprene or similar materials which are resistant to oils. These die cut pads 36 are of a thickness being substantially equal to or slightly greater than the width of the slots when the collet is in its relaxed, normally open position. The pads are cemented to the fingers 22 in the slots 24. Alternately, pads as disclosed in U.S. Pat. No. 3,539,193 may be used in this position.

At the rear of the slots 24 in the relief cutouts 34 is positioned an additional piece of sealing material 38. This material is preferably a short length of round rubber cord which is cut to the proper length, inserted radially into cutouts 34, and adhesively secured within the cutout 34. The cord used for the element 38 need not be as flexible and resilient as the material used for the pad 36 since very little flexing occurs at this point in the slot.

The major portion of the slot 24 is sealed by means of a length of rubber tubing 40 which is cemented to the fingers forming the walls of the respective slots 24. The tubing 40 is also made of a suitable oil-resistant synthetic rubber such as Neoprene, and has a circular cross-section. The tubing, being hollow, will readily collapse to the position seen in FIG. 5 wherein it has an oval shape when the collet is closed. This deformation of the tubing during closing of the collet is readily accommodated by the tubing 40 with little collapse or compression of the rubber material itself as in the case of prior art collet seals.

At the rear of the slots 24, the tubing 40 generally has an oval cross-sectional configuration as seen in FIG. 4 even when the collet 12 is open since the greatest movement of the fingers 22 occurs at their distal ends, and the least movement occurs at their ends adjacent the cutout portions 34. Thus the cross-sectional configuration of the tubing remains substantially as shown in FIG. 4 with but minor change upon opening or closing of the collet, while the cross-sectional configuration of the tubing adjacent the free end of the fingers 22 varies from that of FIG. 6 when the collet is open to that of FIG. 5 when the collet is closed.

Further, the tubing used for the seal may have a diameter which is not particularly critical for a wide range of collet sizes or slot widths, since the tubing may be slightly compressed in order to place it in position in the collet. The important feature is that the seal 40 is deformed without substantial compression. To position the tubing 40 within the collet, all that is necessary is to cut the tubing to the requisite length, apply a suitable adhesive to the tubing or to the walls of the slot, and insert the tubing into the slot. The tubing forms a good seal in the slots to prevent entry of foreign material from inside the collet to the space between the collet and spindle.

DESCRIPTION OF AN ALTERNATE EMBODIMENT

An alternate embodiment of this invention is shown in FIGS. 7 and 8 of which are similar to FIGS. 6 and 5. In this alternate embodiment, the collet fingers 22' are separated by slots 24'. Instead of the tubing 40 as used in the embodiment of FIG. 1, a similar length of rubber which has been extruded to a semi-circular section is used. One of these semi-circular cross-sectional pieces 42 is secured in the slots 24' as is clearly seen in FIGS. 7 and 8. A suitable adhesive is used to secure the elements 42 in place. FIG. 7 shows the cross-sectional shape of the element 42 near the distal ends of the fingers 22 when the collet is in the open, relaxed state while FIG. 8 shows the configuration of the same section of the elements 42 when the collet is closed.

The end of the elements 42 which are adjacent the cutout portions 34 have substantially the same cross-sectional configuration whether the collet is opened or closed, and this configuration is substantially the same as that seen in FIG. 8. While the elements 42 are shown in position so that they are convex with respect to the center of the collet and concave outwardly, it is clear that they could be reversed so that they are concave inwardly.

One of the most important features of the seals according to this invention is that the flexure of the collet fingers is accommodated in the seals by a flexing of the seals instead of alternate compression and expansion of the seal material. Thus, the material is subjected to less wear and longer life is obtained for the seals.

While this invention has been described, it will be understood that it is capable of further modification, and this application is intended to cover any variations, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What I claim is:

1. A machine tool collet including:
   a. a cylindrical body having a longitudinal axis,
   b. a collet head at the outer end of said body having a front face,
   c. a plurality of slots in said body extending rearwardly from said front face and thereby forming a plurality of collet fingers,
   d. seal means positioned in said slots and extending over a major portion of the length of said slots,
   e. said seal means comprising an elongated resiliently deformable length of tubing, and
   f. said tubing is adhesively secured in said slots.

2. A collet as in claim 1 and wherein;
   a. said slots include a generally circular relief portion at the rear thereof, and
   b. resilient plug means in said relief portions.

3. A collet as in claim 2 and wherein:
   said seal means further includes a resilient member positioned in said slots adjacent said collet head.

4. A collet as in claim 3 and wherein:
   said resilient plug means and said resilient members are adhesively secured in position.

5. A collet as in claim 1 and wherein:
   said resiliently deformable member has an initially circular configuration.

6. A machine tool collet including:
   a. a cylindrical body having a longitudinal axis,
   b. a collet head at the outer end of said body having a front face,
   c. a plurality of slots in said body extending rearwardly from said front face and thereby forming a plurality of collet fingers,
   d. seal means positioned in said slots and extending over a major portion of the length of said slots,
   e. said seal means comprising an elongated resiliently deformable member having an arcuate cross-sectional configuration transverse to said longitudinal axis and a radius of curvature substantially less than the radius of curvature of said cylindrical body, f. said member being adhesively secured in said slots.

7. A collet as in claim 6 and wherein:

a. said slots include a generally circular relief portion at the rear thereof, and b. resilient plug means secured in said relief portions.

8. A collet as in claim 7 and wherein:

said seal means further includes a resilient member positioned in said slots adjacent said collet head.

9. A collet as in claim 8 and wherein:

said resilient plug means and said resilient members are adhesively secured in position.

* * * * *